United States Patent
Kim

(10) Patent No.: US 9,932,913 B2
(45) Date of Patent: Apr. 3, 2018

(54) METHOD AND APPARATUS FOR ANALYZING VEHICLE DRIVING PATTERN

(71) Applicant: HYUNDAI MOTOR COMPANY, Seoul (KR)

(72) Inventor: Jin-Ha Kim, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 49 days.

(21) Appl. No.: 15/148,603

(22) Filed: May 6, 2016

(65) Prior Publication Data
US 2017/0107919 A1    Apr. 20, 2017

(30) Foreign Application Priority Data

Oct. 14, 2015  (KR) .................. 10-2015-0143284

(51) Int. Cl.
*F02D 29/02* (2006.01)
*F02D 41/24* (2006.01)
*F16H 59/00* (2006.01)

(52) U.S. Cl.
CPC ......... *F02D 29/02* (2013.01); *F02D 41/2451* (2013.01); *F02D 2200/60* (2013.01); *F02D 2200/606* (2013.01); *F16H 2059/003* (2013.01)

(58) Field of Classification Search
CPC ............... F02D 29/02; F02D 2200/60; F02D 2200/606; F02D 41/2451; F16H 2059/003
USPC ................................... 701/56, 102
See application file for complete search history.

(56) References Cited

U.S. PATENT DOCUMENTS

| | | | | |
|---|---|---|---|---|
| 5,519,610 A | * | 5/1996 | Tsutsui | F16H 61/0213 477/34 |
| 5,566,072 A | * | 10/1996 | Momose | B60T 8/174 701/117 |
| 8,612,107 B2 | * | 12/2013 | Malikopoulos | B60W 30/1882 701/101 |

(Continued)

FOREIGN PATENT DOCUMENTS

| JP | 2002-046498 A | 2/2002 |
|---|---|---|
| JP | 2008-018872 A | 1/2008 |

(Continued)

*Primary Examiner* — Erick Solis
(74) *Attorney, Agent, or Firm* — McDermott Will & Emery LLP

(57) ABSTRACT

A method for analyzing a driving pattern of a vehicle includes setting a driving pattern measurement condition, measuring a driving pattern, deducing an engine operating region for the measured driving pattern from an engine control map, calculating each weighting determined according to a distance from the measured driving pattern to each vertex of the engine operating region, accumulating each calculated weighting for each coordinate of the engine operating region, determining whether a current measurement condition departs from the set measurement condition, and calculating a weighting factor for each coordinate under the set measurement condition when the current measurement condition departs from the set measurement condition, wherein, in the step of deducing an engine operating region, the engine operating region refers to a virtual block defined by four vertex coordinates of a pixel, in which the measured driving pattern is present, in the engine control map.

8 Claims, 4 Drawing Sheets

(56) References Cited

U.S. PATENT DOCUMENTS

| | | | |
|---|---|---|---|
| 2012/0029801 A1 | 2/2012 | Yano et al. | |
| 2012/0136506 A1* | 5/2012 | Takeuchi | B60G 17/016 |
| | | | 701/1 |
| 2014/0222296 A1* | 8/2014 | Takeuchi | B60W 50/082 |
| | | | 701/48 |
| 2014/0277972 A1* | 9/2014 | Jeon | B60W 50/10 |
| | | | 701/51 |
| 2014/0371949 A1* | 12/2014 | Jeon | B60W 50/10 |
| | | | 701/1 |
| 2015/0066319 A1* | 3/2015 | Jeon | F16H 61/0213 |
| | | | 701/58 |

FOREIGN PATENT DOCUMENTS

| | | |
|---|---|---|
| JP | 2010-210240 A | 9/2010 |
| JP | 2013-221418 A | 10/2013 |
| JP | 2014-151797 A | 8/2014 |
| KR | 10-1012859 B1 | 2/2011 |
| KR | 10-1383261 B1 | 4/2014 |

\* cited by examiner

METHOD AND APPARATUS FOR ANALYZING VEHICLE DRIVING PATTERN

CROSS-REFERENCE TO RELATED APPLICATIONS

This application claims the benefit of priority to Korean Patent Application No. 10-2015-0143284, filed on Oct. 14, 2015 with the Korean Intellectual Property Office, which is incorporated herein by reference in its entirety.

TECHNICAL FIELD

Exemplary embodiments of the present disclosure relate to a method and apparatus for analyzing a vehicle driving pattern and, particularly, to a method and apparatus for analyzing a driving pattern of each individual vehicle using an algorithm to resolve various issues which may occur in a vehicle engine due to a driver's driving habits.

BACKGROUND

Generally, certain driving habits, including sudden stopping or sudden accelerating, can lower fuel efficiency, cause engines to frequently enter DPF, $SO_X$, or $NO_X$ regeneration modes and damage turbochargers or EGR valves.

As a countermeasure to this, the prior art generally adopts a method of limiting engine control variables such as vehicle speed, an engine rpm, an engine load, an exhaust gas temperature, etc. in order to avoid operating regions in which issues may occur in an engine. Thus, the prior art discloses a method of passively avoiding the problem by controlling the engine regardless of a driving pattern for each driver.

SUMMARY OF THE DISCLOSURE

An embodiment of the present disclosure is directed to a method and apparatus for analyzing a driving pattern of a vehicle, capable of digitizing an engine operating state using an algorithm in order to cope with an engine issue arising from a driving pattern for each driver.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method for analyzing a driving pattern of a vehicle includes setting a driving pattern measurement condition; measuring a driving pattern ($A_i(x_i, y_i)$) comprising an engine rpm and an engine load or a vehicle speed and the number of gear stages under a set measurement condition set in the setting step; deducing an engine operating region for the measured driving pattern ($A_i(x_i, y_i)$) from an engine control map expressed as the engine rpm and the engine load; calculating each weighting determined according to a distance from the measured driving pattern ($A_i(x_i, y_i)$) to each vertex of the engine operating region; accumulating each calculated weighting for each coordinate of the engine operating region; determining whether a current measurement condition departs from the set measurement condition; and calculating a weighting factor for each coordinate under the set measurement condition when the current measurement condition departs from the set measurement condition, the weighting factor being a ratio of the accumulated weighting at each coordinate to a sum of accumulated weightings at all coordinates of the engine operating region, wherein, in the step of deducing an engine operating region, the engine operating region refers to a virtual block defined by four vertex coordinates (($x_{Li}$, $y_{Li}$), ($x_{Ui}$, $y_{Li}$), ($x_{Li}$, $y_{Ui}$), and ($x_{Ui}$, $Y_{Ui}$)) of a pixel, in which the measured driving pattern ($A_i(x_i, y_i)$) is present, in the engine control map.

The step of measuring a driving pattern ($A_i(x_i, y_i)$) may be performed again when the current measurement condition is under the set measurement condition.

In the step of setting a driving pattern measurement condition, the driving pattern measurement condition may be a condition in which the driving pattern is continuously measured until a predetermined time.

In the step of setting a driving pattern measurement condition, the driving pattern measurement condition may be a condition in which the driving pattern is continuously measured for a predetermined time zone or day.

In the step of setting a driving pattern measurement condition, the driving pattern measurement condition may be a condition in which the driving pattern is continuously measured when a coolant temperature is equal to or greater than a predetermined first temperature and is equal to or less than a predetermined second temperature.

In the step of calculating each weighting, the respective weightings for four vertices of the engine operating region may be calculated by the following Equation:

$$B_{LiLi} = \sqrt{\left(\frac{x_{Ui} - x_i}{x_{Ui} - x_{Li}}\right)^2 + \left(\frac{y_{Ui} - y_i}{y_{Ui} - y_{Li}}\right)^2}$$

$$B_{UiLi} = \sqrt{\left(\frac{x_{Li} - x_i}{x_{Ui} - x_{Li}}\right)^2 + \left(\frac{y_{Ui} - y_i}{y_{Ui} - y_{Li}}\right)^2}$$

$$B_{LiUi} = \sqrt{\left(\frac{x_{Ui} - x_i}{x_{Ui} - x_{Li}}\right)^2 + \left(\frac{y_{Li} - y_i}{y_{Ui} - y_{Li}}\right)^2}$$

$$B_{UiUi} = \sqrt{\left(\frac{x_{Li} - x_i}{x_{Ui} - x_{Li}}\right)^2 + \left(\frac{y_{Li} - y_i}{y_{Ui} - y_{Li}}\right)^2},$$

where the $B_{LiLi}$ is a weighting at an upper left vertex ($x_{Li}$, $y_{Li}$) of $A_i(x_i, y_i)$, the $B_{UiLi}$ is a weighting at an upper right vertex ($x_{U1}$, $y_{L1}$) of $A_i(x_i, y_i)$, the $B_{LiUi}$ is a weighting at a lower left vertex ($x_{Li}$, $y_{Ui}$) of $A_i(x_i, y_i)$, and the $B_{UiUi}$ is a weighting at a lower right vertex ($x_{Ui}$, $y_{Ui}$) of $A_i(x_i, y_i)$.

In the step of calculating a weighting factor, the weighting factor for each coordinate under the set measurement condition may be calculated by the following Equation:

$$\text{Weighting Factor of } C_{mn} = \frac{C_{mn}}{\sum_{m=1, n=1} C_{mn}},$$

where the $C_{mn}$ is an accumulated weighting at a coordinate ($e_m$, $f_n$), the $$\sum_{m=1, n=1} C_{mn}$$

is a sum of accumulated weightings at all coordinates of the engine operating region, and the Weighting Factor of $C_{mn}$ is a weighting factor at the coordinate ($e_m$, $f_n$).

In accordance with another embodiment of the present disclosure, a storage medium stores a method of analyzing a vehicle driving pattern, an engine control map, calculated weightings, and calculated weighting factors.

In accordance with another embodiment of the present disclosure, an apparatus for analyzing a driving pattern of a vehicle includes a storage medium, a measurement unit for measuring an engine rpm and an engine load (a fuel amount or an engine torque), or a vehicle speed and the number of gear stages, and a calculation unit for calculating weightings and weighting factors by means of a method of analyzing a vehicle driving pattern, based on the engine rpm and fuel amount measured by the measurement unit.

DETAILED DESCRIPTION

Figure 1:
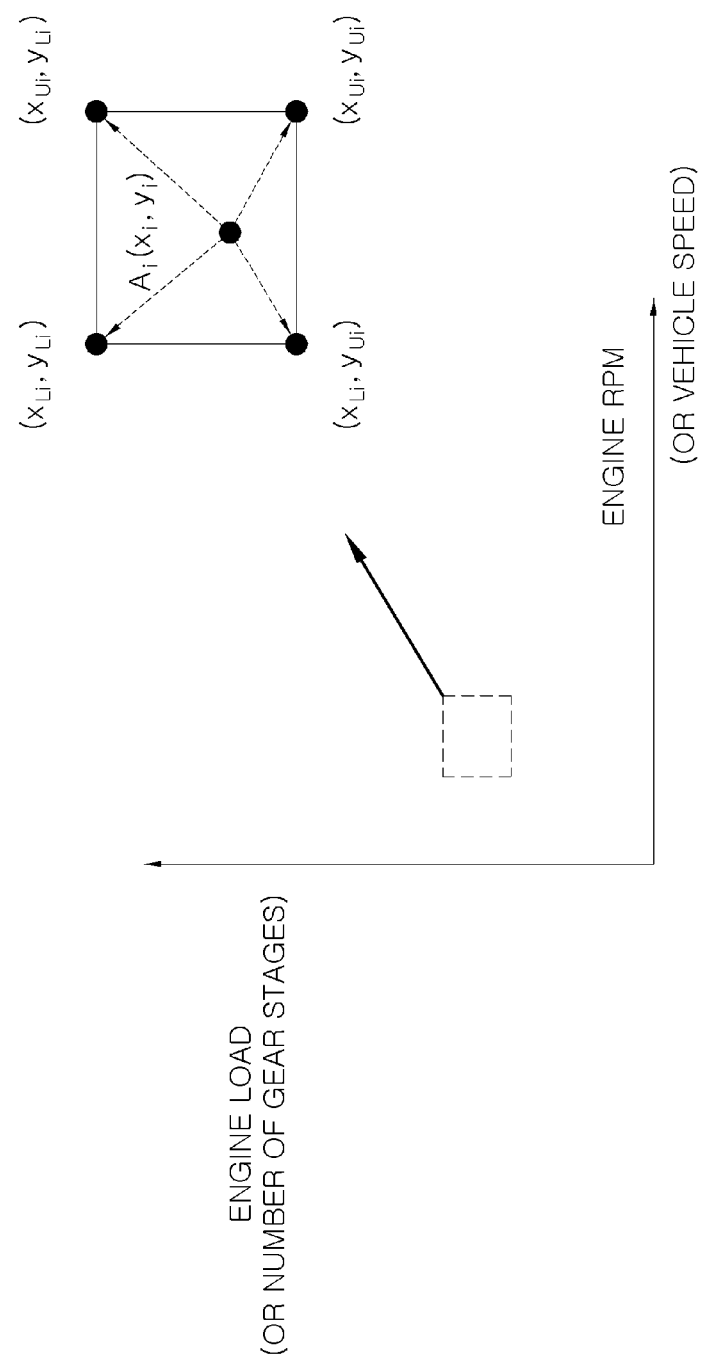
FIGS. 1 and 2 are conceptual views illustrating a process of calculating weighting factors according to an embodiment of the present disclosure.

The terms and words used in the specification and claims should not be construed as their ordinary or dictionary sense. On the basis of the principle that the inventor can define the appropriate concept of a term in order to describe his/her own disclosure in the best way, it should be construed as meaning and concepts for complying with the technical idea of the present disclosure. Accordingly, the embodiments described in the present specification and the construction shown in the drawings are nothing but one preferred embodiment of the present disclosure, and it does not cover all the technical ideas of the disclosure. Thus, it should be understood that various changes and modifications may be made at the time of filing the present application. In addition, detailed descriptions of functions and constructions well known in the art may be omitted to avoid unnecessarily obscuring the gist of the present disclosure. Exemplary embodiments of the present disclosure will be described below in more detail with reference to the accompanying drawings.

Figure 2:
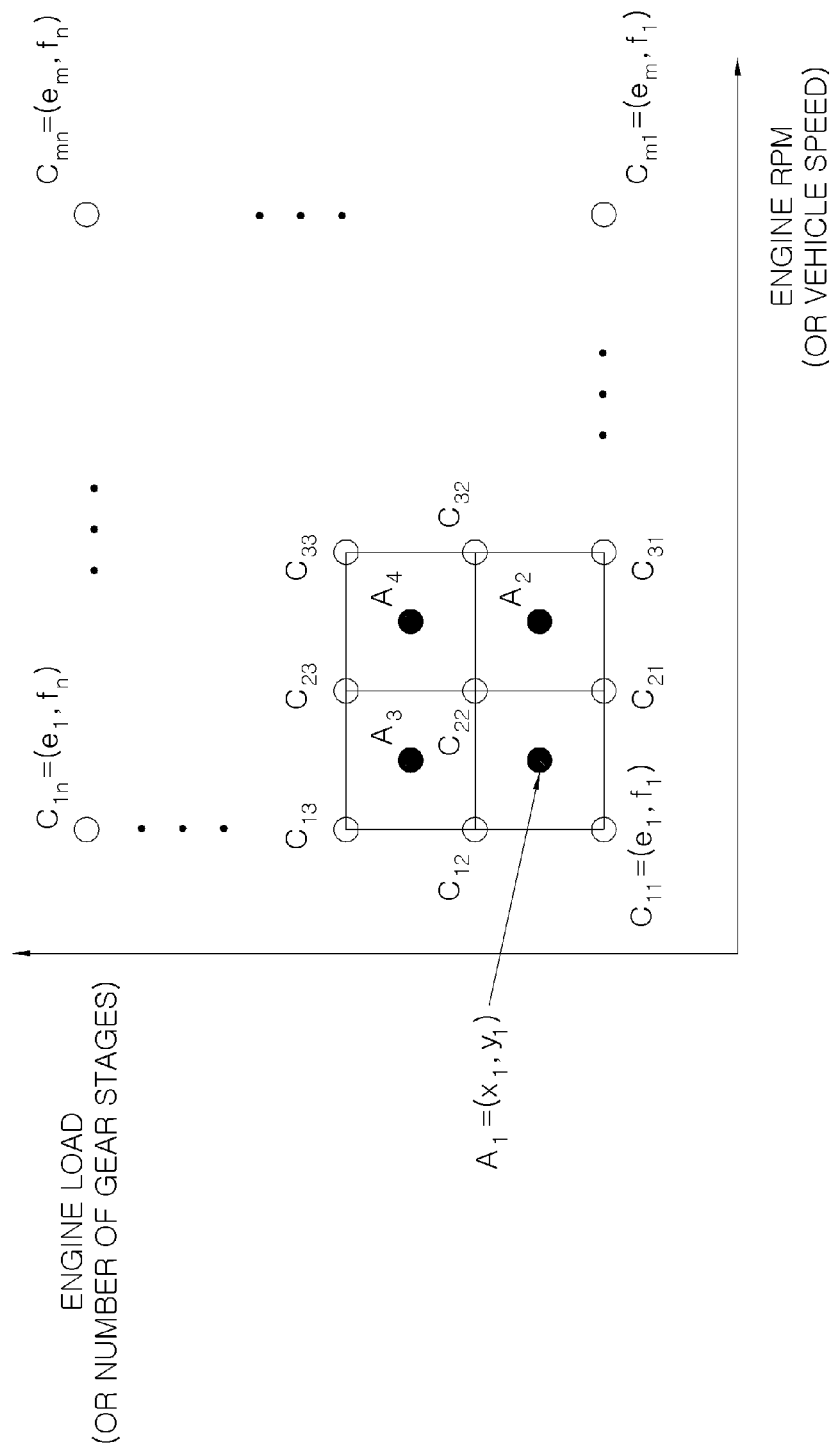

FIGS. 1 and 2 are conceptual views illustrating a process of calculating weighting factors according to an embodiment of the present disclosure. Hereinafter, a concept of the present disclosure will be described in detail. In the present disclosure, a weighting factor for the driving pattern of a specific vehicle, which consists of an engine rpm and an engine load (a fuel amount or an engine torque) or a vehicle speed and the number of gear stages and a reflection of a driver's individual driving habits, may be calculated by extracting a virtual block, as illustrated in FIG. 1.

In FIG. 1, $A_i(x_i, y_i)$ refers to a driving pattern of a vehicle, and may be the actual driving region of the vehicle. In addition, the region defined by four coordinates $(x_{Li}, y_{Li})$, $(x_{Ui}, y_{Li})$, and $(x_{Li}, Y_{Ui})$ is an engine operating region in which the driving pattern $A_i(x_i, y_i)$ is present. In connection with the driving pattern $A_i(x_i, y_i)$, weightings are respectively applied to the four vertex coordinates $(x_{Li}, y_{Li})$, $(x_{Ui}, y_{Li})$, $(x_{Li}, y_{Ui})$, and $(x_{Ui}, Y_{Ui})$ of the engine operating region. In this case, the closer the coordinates are to the $A_i(x_i, y_i)$, the greater the weightings may become, whereas the farther coordinates are away from the $A_i(x_i, y_i)$, the smaller the weightings become. A method of calculating the weightings will be described in detail below (see step S400).

The calculated weighting at each vertex may be repeatedly accumulated for each vertex coordinate of the engine operating region until a current measurement condition may depart from a set measurement condition. In addition, the ratio of the weighting at each coordinate to the whole weighting accumulated after the current measurement condition departs from the set measurement condition may be calculated as a weighting factor for each coordinate under the set measurement condition. The method of calculating the weighting factor will be described in detail below (see step S500 and S700).

In addition, when the current measurement condition is under the set measurement condition, a step of measuring the driving pattern $A_i(x_i, y_i)$ (S200) may be performed again, so that a weighting at each vertex coordinate for a new measured driving pattern $A_i(x_i, y_i)$ is calculated and repeatedly accumulated.

For example, after a weighting for an initial driving pattern $A_1(x_1, y_1)$ is calculated, a weighting for a next driving pattern $A_2(x_2, y_2)$ may be calculated when the current measurement condition is under the set measurement condition. The initial driving pattern $A_1(x_1, y_1)$ and the next driving pattern $A_2(x_2, y_2)$ may vary. Thus, an engine operating region in which the initial driving pattern $A_1(x_1, y_1)$ is present (i.e. in the engine control map, a virtual block defined by four vertex coordinates $(x_{L1}, y_{L1})$, $(x_{U1}, y_{L1})$, $(x_{L1}, y_{U1})$, and $(x_{U1}, y_{U1})$ of the pixel in which the initial driving pattern $A_1(x_1, y_1)$ is present) may be shifted to an engine operating region in which the next driving pattern $A_2(x_2, y_2)$ is present (i.e. in the engine control map, a virtual block defined by four vertex coordinates $(x_{L2}, y_{L2})$, $(x_{U2}, y_{L2})$, $(x_{L2}, y_{U2})$, and $(x_{U2}, y_{U2})$ of the pixel in which the next driving pattern $A_2(x_2, y_2)$ is present). In addition, when a weighting at each coordinate of the shifted engine operating region is calculated, the weighting may be repeatedly accumulated for each vertex coordinate of the engine operating region.

Various issues which may occur in the engine of the vehicle due to a driver's driving habits (driving patterns) can be actively resolved using the calculated weighting factor for each coordinate. For example, it may be also possible to control the engine so as to exhibit optimal fuel efficiency within the restricted range of exhaust gas by analyzing a driver's individual driving habits. In addition, in the vehicle where the engine is frequently idling or overruns, it may be also possible to control the engine so as to prevent the damage of DPFs (Diesel Particulate Filters) under an uncontrolled burning condition by lowering a target regeneration temperature. In addition, smoke discharged from the engine appears in different forms according to an engine rpm and an engine load. Accordingly, it may be also possible to control the engine so as to prevent the DPFs from being frequently regenerated by increasing an amount of air intake for the regeneration of soot in the region in which the smoke is increased. In addition, in a vehicle in which the engine is primarily operated under a full load condition (full acceleration condition), it may be also possible to control the engine so as to lower a boost pressure and a fuel amount to a certain level in order to protect turbochargers. In addition, in a vehicle in which the engine is primarily operated in the region in which the flow of EGR exhaust gas is high, it may be also possible to control the engine so as to increase an amount of air intake to a certain level in order to protect EGR valves.

Figure 3:
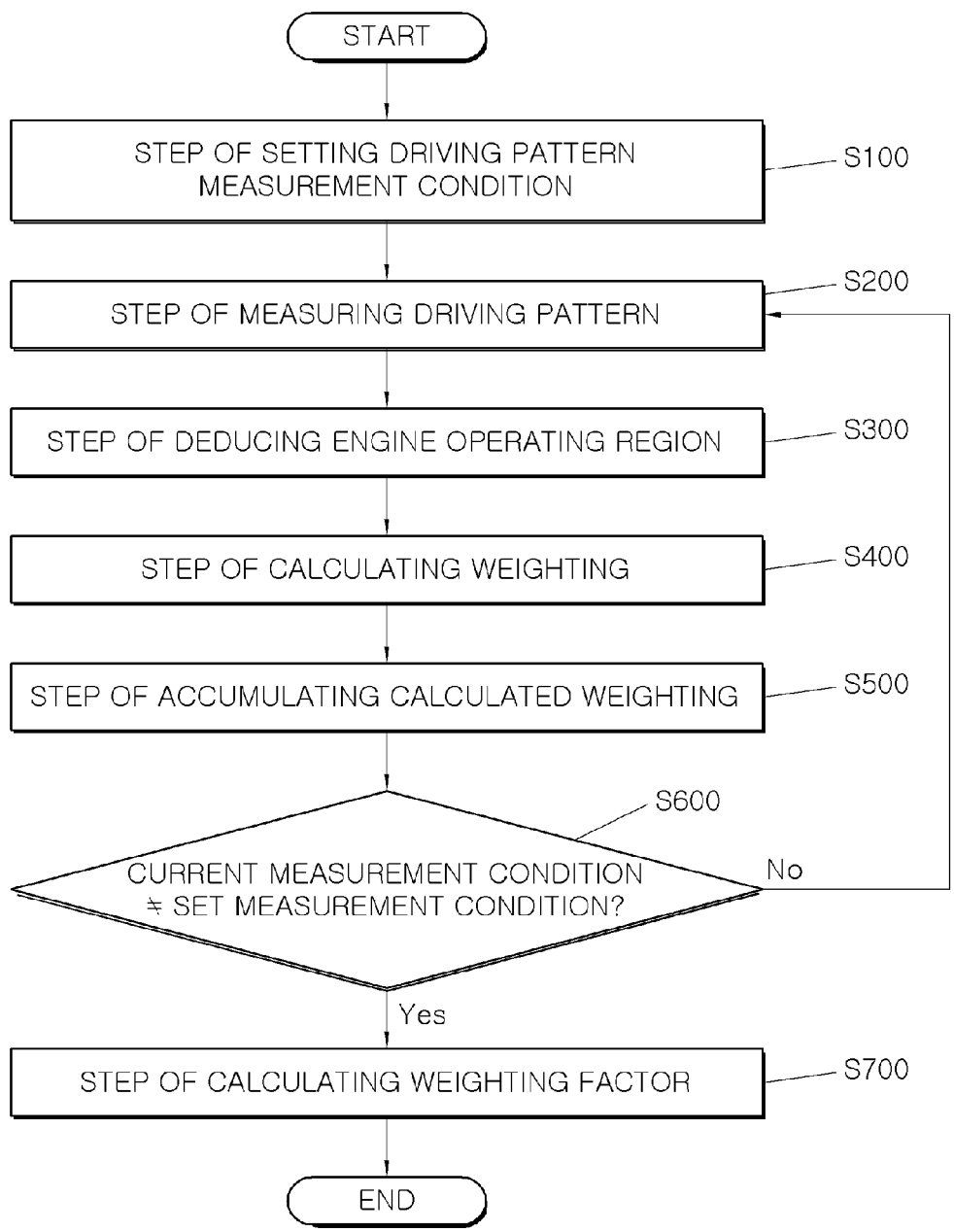
FIG. 3 is a flowchart illustrating a method for analyzing a driving pattern of a vehicle according to an embodiment of the present disclosure.

FIG. 3 is a flowchart illustrating a method for analyzing a driving pattern of a vehicle according to an embodiment of the present disclosure. Referring to FIG. 3, the method for analyzing a driving pattern of a vehicle according to the embodiment of the present disclosure may include a step of setting a driving pattern measurement condition (S100), a step of measuring a driving pattern $A_i(x_i, y_i)$ which consists of an engine rpm and an engine load (a fuel amount or an engine torque) or a vehicle speed and the number of gear stages under the set measurement condition (S200), a step of deducing an engine operating region for the measured driving pattern $A_i(x_i, y_i)$ from an engine control map expressed as the engine rpm and the engine load (S300), a step of calculating each weighting determined according to the distance from the measured driving pattern to each vertex of the engine operating region (S400), a step of accumulating each calculated weighting (S500), a step of determining whether a current measurement condition departs from the set measurement condition (S600), and a step of calculating a weighting factor, which is the ratio of the accumulated weighting at each coordinate to the sum of accumulated weightings at all coordinates of the engine operating region, under the set measurement condition when the current measurement condition departs from the set measurement condition (S700).

In the method for analyzing a driving pattern of a vehicle, the step of measuring a driving pattern (S200) may be performed again when the current measurement condition is under the set measurement condition. For example, after a weighting for an initial driving pattern $A_1(x_1, y_1)$ is calculated, a weighting for a next driving pattern $A_2(x_2, y_2)$ is calculated when the current measurement condition is under the set measurement condition. The initial driving pattern $A_1(x_1, y_1)$ and the next driving pattern $A_2(x_2, y_2)$ may vary. Thus, an engine operating region in which the initial driving pattern $A_1(x_1, y_1)$ is present (i.e. in the engine control map, a virtual block defined by four vertex coordinates $(x_{L1}, y_{L1})$, $(x_{U1}, y_{L1})$, $(x_{L1}, y_{U1})$, and $(x_{U1}, y_{U1})$ of the pixel in which the initial driving pattern $A_1(x_1, y_1)$ is present) may be shifted to an engine operating region in which the next driving pattern $A_2(x_2, y_2)$ is present (i.e. in the engine control map, a virtual block defined by four vertex coordinates $(x_{L2}, y_{L2})$, $(x_{U2}, y_{L2})$, $(x_{L2}, y_{U2})$, and $(x_{U2}, y_{U2})$ of the pixel in which the next driving pattern $A_2(x_2, y_2)$ is present).

The driving pattern measurement condition in step S100 may be a condition in which the driving pattern is continuously measured until a predetermined time. For example, the predetermined time may be 30 hours after the measurement begins. The driving pattern measurement condition in step S100 may be a condition in which the driving pattern is continuously measured for a predetermined time zone or day. For example, the predetermined time zone or day may be between 9 o'clock and 10 o'clock for 30 days, Monday for 8 weeks, or the like.

The driving pattern measurement condition in step S100 may be a condition in which the driving pattern is continuously measured when a coolant temperature is equal to or greater than a predetermined first temperature and is equal to or less than a predetermined second temperature. That is, the driving pattern may be analyzed according to a coolant temperature condition.

The engine operating region in step S300 may be a virtual block defined by four vertex coordinates $(x_{Li}, y_{Li})$, $(x_{Ui}, y_{Li})$, $(x_{Li}, Y_{Ui})$, and $(x_{Ui}, y_{Ui})$ of the pixel in which the measured driving pattern $A_i(x_i, y_i)$ is present, in the engine control map. That is, the engine control map may take a virtual block in which pixels are collected, instead of taking a linear table.

Thus, the measured driving pattern $A_i(x_i, y_i)$ may be within a pixel. In this case, the virtual block defined by four vertex coordinates $(x_{Li}, y_{Li})$, $(x_{Ui}, y_{Li})$, $(x_{Li}, y_{Ui})$, and $(x_{Ui}, y_{Ui})$ of the pixel means the engine operating region. Accordingly, since the effect of change in one pixel on engine control may be expressed as a percentage (%), a variation in fuel efficiency or exhaust gas according to the change of engine control variables may be easily predicted.

In step S400, the respective weightings for the four vertices of the engine operating region are calculated by the following Equation 1.

$$B_{LiLi} = \sqrt{\left(\frac{x_{Ui} - x_i}{x_{Ui} - x_{Li}}\right)^2 + \left(\frac{y_{Ui} - y_i}{y_{Ui} - y_{Li}}\right)^2} \quad \text{[Equation 1]}$$

$$B_{UiLi} = \sqrt{\left(\frac{x_{Li} - x_i}{x_{Ui} - x_{Li}}\right)^2 + \left(\frac{y_{Ui} - y_i}{y_{Ui} - y_{Li}}\right)^2}$$

$$B_{LiUi} = \sqrt{\left(\frac{x_{Ui} - x_i}{x_{Ui} - x_{Li}}\right)^2 + \left(\frac{y_{Li} - y_i}{y_{Ui} - y_{Li}}\right)^2}$$

$$B_{UiUi} = \sqrt{\left(\frac{x_{Li} - x_i}{x_{Ui} - x_{Li}}\right)^2 + \left(\frac{y_{Li} - y_i}{y_{Ui} - y_{Li}}\right)^2}$$

Here, the $B_{LiLi}$ is a weighting at the upper left vertex $(x_{Li}, y_{Li})$ of the $A_i(x_i, y_i)$, the $B_{UiLi}$ is a weighting at the upper right vertex $(x_{U1}, y_{L1})$ of the $A_i(x_i, y_i)$, the $B_{LiUi}$ is a weighting at the lower left vertex $(x_{Li}, y_{Ui})$ of the $A_i(x_i, y_i)$, and the $B_{UiUi}$ is a weighting at the lower right vertex $(x_{Ui}, y_{Ui})$ of the $A_i(x_i, y_i)$.

That is, the weighting may be set to be large as the measured driving pattern $A_i(x_i, y_i)$, or the actual driving region of the vehicle, is close to each vertex of the engine operating region defined by four vertex coordinates $(x_{Li}, y_{Li})$, $(x_{Ui}, y_{Li})$, $(x_{Li}, y_{Ui})$, and $(x_{Ui}, y_{Ui})$, whereas the weighting may be set to be small as the measured driving pattern $A_i(x_i, y_i)$ is far away from each vertex of the engine operating region defined by four vertex coordinates $(x_{Li}, y_{Li})$, $(x_{Ui}, y_{Li})$, $(x_{Li}, y_{Ui})$, and $(x_{Ui}, y_{Ui})$.

In step S700, the weighting factor for each coordinate under the set measurement condition may be calculated by the following Equation 2.

$$\text{Weighting Factor of } C_{mn} = \frac{C_{mn}}{\sum_{m=1,n=1} C_{mn}}$$

Here, the $C_{mn}$ is an accumulated weighting at a coordinate $(e_m, f_n)$, the $$\sum_{m=1,n=1} C_{mn}$$

is the sum of accumulated weightings at all coordinates of the engine operating region, and the Weighting Factor of $C_{mn}$ is a weighting factor at a coordinate $(e_m, f_n)$. The $C_{mn}$ is calculated in step S500.

For example, the driving pattern $A_i(x_i, y_i)$ may vary over time, as illustrated in FIG. 2 (it is assumed that the driving pattern is measured from $A_1(x_1, y_1)$ to $A_4(x_4, y_4)$ while the current measurement condition satisfies the set measurement condition in FIG. 2). Thus, the engine operating area defined by four vertex coordinates $(x_{Li}, y_{Li})$, $(x_{Ui}, y_{Li})$, $(x_{Li}, y_{Ui})$, and $(x_{Ui}, y_{Ui})$ also may vary. That is, all $(x_{U1}, y_{L1})$, $(x_{L2}, y_{L2})$, $(x_{U3}, y_{U3})$, and $(x_{L4}, y_{U4})$ in the engine operating region may correspond to a coordinate $(e_2, f_2)$.

The sum $C_{22}$ of weightings at the coordinate $(e_2, f_2)$ may be expressed as the following Equation 3. That is, the $C_{22}$ may be a result value in the step of accumulating the calculated weighting (S500) (see step S500).

$$C_{22} = B_{U1L1} + B_{L2L2} + B_{U3U3} + B_{L4U4} \quad \text{[Equation 3]}$$

Through such a principle, the sum of weightings at each coordinate may be expressed as the following Equation 4 (see step S500).

$$C_{11} = B_{L1U1}$$

$$C_{12} = B_{L1L1} + B_{L3U3}$$

$$C_{13} = B_{L3L3}$$

$$C_{21} = B_{U1U1} + B_{L2U2}$$

$$C_{22} = B_{U1L1} + B_{L2L2} + B_{U3U3} + B_{L4U4}$$

$$C_{23} = B_{U3L3} + B_{L4L4}$$

$$C_{31} = B_{U2U2}$$

$$C_{32} = B_{U2L2} + B_{U4U4}$$

$$C_{33} = B_{U4L4} \quad \text{[Equation 4]}$$

Through the above equation, the Weighting Factor of $C_{22}$ as a weighting factor at the coordinate $(e_2, f_2)$ may be expressed as the following Equation 5 (see step S700).

[Equation 5]

$$\text{Weighting Factor of } C_{22} = \frac{C_{22}}{C_{11} + C_{12} + C_{13} + C_{21} + C_{22} + C_{23} + C_{31} + C_{32} + C_{33}}$$

That is, after the measurement of the driving pattern is completed, the ratio of the accumulated weighting at each coordinate to the sum of weightings at all coordinates of the engine operating region may be calculated as a weighting factor at each coordinate under the set measurement condition. Consequently, various issues which may occur in the engine of the vehicle due to a driver's driving habits can be actively resolved using the calculated weighting factor for each coordinate.

Figure 4:
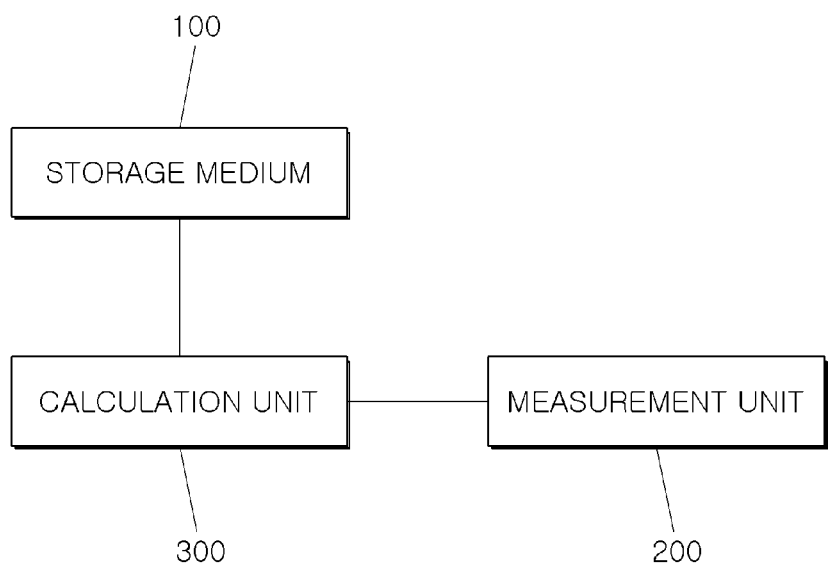
FIG. 4 is a block diagram illustrating an apparatus for analyzing a driving pattern of a vehicle according to an embodiment of the present disclosure.

FIG. 4 is a block diagram illustrating an apparatus for analyzing a driving pattern of a vehicle according to another embodiment of the present disclosure. Referring to FIG. 4, the apparatus for analyzing a driving pattern of a vehicle according to another embodiment of the present disclosure may include a storage medium 100, a measurement unit 200 and a calculation unit 300. The storage medium 100 may store a method of analyzing a driving pattern of a vehicle, an engine control map, calculated weightings and calculated weighting factors.

The measurement unit 200 may measure an engine rpm and an engine load (a fuel amount or an engine torque). Alternatively, the measurement unit 200 may measure a vehicle speed and the number of gear stages. In addition, the measurement unit 200 may measure a coolant temperature.

The calculation unit 300 may calculate weightings and weighting factors by means of the method of analyzing a driving pattern of a vehicle, based on the engine rpm and engine load (fuel amount or engine torque) or the vehicle speed and number of gear stages measured by the measurement unit 200.

In accordance with the exemplary embodiments of the present disclosure, digitized data for an engine operating state according to a driver's individual driving pattern can be acquired by analyzing the driving pattern of a vehicle.

In addition, it is possible to improve the fuel efficiency of the vehicle, stably control after-treatment systems (e.g. LNT/DPF, etc.), and prevent a turbocharger and an EGR valve from being damaged, by means of using the acquired data.

While the present disclosure has been described with respect to the specific embodiments, it will be apparent to those skilled in the art that various changes and modifications may be made without departing from the spirit and scope of the disclosure as defined in the following claims.

What is claimed is:

1. A method for analyzing a driving pattern of a vehicle to control an engine of the vehicle according to the analyzed driving pattern, comprising steps of:
   setting, by a processor, a driving pattern measurement condition;
   measuring, by at least one measurement sensor of the vehicle, a driving pattern $(A_i(x_i, y_i))$ comprising an engine rpm and an engine load under the measurement condition set in the setting step;
   deducing, by the processor, an engine operating region for the measured driving pattern $(A_i(x_i, y_i))$ from an engine control map expressed as the engine rpm and the engine load;
   calculating, by the processor, each weighting determined according to a distance from the measured driving pattern $(A_i(x_i, y_i))$ to each vertex of the engine operating region;
   accumulating, by the processor, each calculated weighting for each coordinate of the engine operating region;
   determining, by the processor, whether a current measurement condition departs from the set measurement condition; and
   calculating, by the processor, a weighting factor for each coordinate under the set measurement condition when the current measurement condition departs from the set measurement condition, the weighting factor being a ratio of the accumulated weighting at each coordinate to a sum of accumulated weightings at all coordinates of the engine operating region,
   wherein, in the step of deducing an engine operating region, the engine operating region refers to a virtual block defined by four vertex coordinates $((x_{Li}, y_{Li}), (x_{Ui}, y_{Li}), (x_{Li}, y_{Ui}), \text{ and } (x_{Ui}, y_{Ui}))$ of a pixel, in which the measured driving pattern $(A_i(x_i, y_i))$ is present, in the engine control map, and
   wherein instruments to perform the method are stored in a storage medium coupled to the processor.

2. The method of claim 1, wherein the step of measuring a driving pattern $(A_i(x_i, y_i))$ is performed again when the current measurement condition is under the set measurement condition.

3. The method of claim 1, wherein, in the step of setting a driving pattern measurement condition, the driving pattern measurement condition is a condition in which the driving pattern is continuously measured until a predetermined time.

4. The method of claim 1, wherein, in the step of setting a driving pattern measurement condition, the driving pattern measurement condition is a condition in which the driving pattern is continuously measured for a predetermined time zone or day.

5. The method of claim 1, wherein, in the step of setting a driving pattern measurement condition, the driving pattern measurement condition is a condition in which the driving pattern is continuously measured when a coolant temperature is equal to or greater than a predetermined first temperature and is equal to or less than a predetermined second temperature.

6. The method of claim 1, wherein, in step of the calculating each weighting, the respective weightings for four vertices of the engine operating region are calculated by the following Equation:

$$B_{LiLi} = \sqrt{\left(\frac{x_{Ui} - x_i}{x_{Ui} - x_{Li}}\right)^2 + \left(\frac{y_{Ui} - y_i}{y_{Ui} - y_{Li}}\right)^2}$$

$$B_{UiLi} = \sqrt{\left(\frac{x_{Li} - x_i}{x_{Ui} - x_{Li}}\right)^2 + \left(\frac{y_{Ui} - y_i}{y_{Ui} - y_{Li}}\right)^2}$$

$$B_{LiUi} = \sqrt{\left(\frac{x_{Ui} - x_i}{x_{Ui} - x_{Li}}\right)^2 + \left(\frac{y_{Li} - y_i}{y_{Ui} - y_{Li}}\right)^2}$$

$$B_{UiUi} = \sqrt{\left(\frac{x_{Li} - x_i}{x_{Ui} - x_{Li}}\right)^2 + \left(\frac{y_{Li} - y_i}{y_{Ui} - y_{Li}}\right)^2},$$

where the $B_{LiLi}$ is a weighting at an upper left vertex $(x_{Li}, y_{Li})$ of $A_i(x_i, y_i)$, the $B_{UiLi}$ is a weighting at an upper right vertex $(x_{U1}, y_{L1})$ of $A_i(x_i, y_i)$, the $B_{LiUi}$ is a weighting at a lower left vertex $(x_{Li}, y_{Ui})$ of $A_i(x_i, y_i)$, and the $B_{UiUi}$ is a weighting at a lower right vertex $(x_{Ui}, y_{Ui})$ of $A_i(x_i, y_i)$.

7. The method of claim 6, wherein, in the step of calculating a weighting factor, the weighting factor for each coordinate under the set measurement condition is calculated by the following Equation:

$$\text{Weighting Factor of } C_{mn} = \frac{C_{mn}}{\sum_{m=1, n=1} C_{mn}},$$

where the $C_{mn}$ is an accumulated weighting at a coordinate $(e_m, f_n)$, the $$\sum_{m=1, n=1} C_{mn}$$

is a sum of accumulated weightings at all coordinates of the engine operating region, and the Weighting Factor of $C_{mn}$ is a weighting factor at the coordinate $(e_m, f_n)$.

8. An apparatus for analyzing a driving pattern of a vehicle to control an engine of the vehicle according to the analyzed driving pattern, comprising:
a storage medium for storing the method of analyzing a vehicle driving pattern according to claim 1, an engine control map, calculated weightings, and calculated weighting factors;
at least one measurement sensor for measuring an engine rpm and an engine load; and
a processor, which is coupled to the storage medium, for calculating weightings and weighting factors by means of the method of analyzing a vehicle driving pattern, based on the engine rpm and the engine load measured by the at least one measurement sensor.

* * * * *